Jan. 17, 1950 W. HUPPERT 2,495,104
ANCHORING DEVICE
Original Filed May 23, 1945

INVENTOR.
WILLIAM HUPPERT
BY
ATTORNEY

Patented Jan. 17, 1950

2,495,104

UNITED STATES PATENT OFFICE 2,495,104

ANCHORING DEVICE

William Huppert, New York, N. Y.

Original application May 23, 1945, Serial No. 595,451. Divided and this application June 16, 1949, Serial No. 99,453

2 Claims. (Cl. 85—5)

This invention relates to an anchoring device for fastening one part to another or for joining two parts together, and is a division of my copending application Ser. No. 595,451 filed May 23, 1945.

Briefly described, the device comprises a metal body having one or more integral prongs at one or both ends. It is intended to be inserted, without pressure, into a preformed cavity or cavities in the part or parts to which it is to be attached or which are to be joined together. When so inserted, and upon application of pressure, the prong or prongs are bent or spread outwardly to bite into the material surrounding the cavity or cavities so as to secure the device firmly in place.

The device may be used for attachment to, or for joining together, parts made of material that is relatively softer than the metal of which the device is made. It is particularly useful with plastic parts. Considerable difficulty has been experienced in satisfactorily attaching a metal part or insert to a part made of molded plastic such as Bakelite, Tenite, Catalin, etc., or in connecting together two or more parts made of such plastic. The present invention provides an efficient means for accomplishing these, as well as other, purposes.

While the device may be employed in various fields, it is especially useful in the electrical art for attaching metal parts or inserts to molded plastic bodies, such for example, as attaching blades to plastic bodies of electric plugs, or for connecting together in assembled relation parts of electric connectors, outlets, and other electrical articles or appliances. The anchoring device proper, with which this invention is concerned, may itself constitute a portion of the metal part to be attached to a plastic body. For instance, in the case of an electrical plug blade the anchoring device may be an integral portion of the blade construction. Furthermore, the device may be formed to serve the secondary function of securing a wire, cord or other electrical conductor in place and providing effective contact therewith.

The principal object of the invention is to provide a simple and inexpensive device for easily, rapidly and securely attaching an insert to a part or for connecting a plurality of parts together.

Another object is to provide anchoring devices that can be stamped from a metal blank without requiring any bending operation to form the prongs.

A still further object is to provide an anchoring device adapted to be freely inserted into a cavity in the part to which it is to be applied and then to be secured therein by bending or spreading the prong or prongs outwardly.

The accompanying drawings illustrate certain embodiments of the invention, in which.

Figure 1:
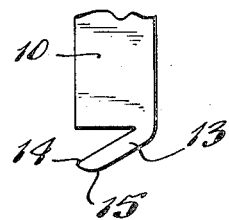
Figure 1 is a face view of one form of the device.
Figure 2:
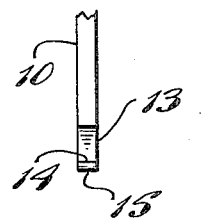
Fig. 2 is a side view thereof.
Figure 3:
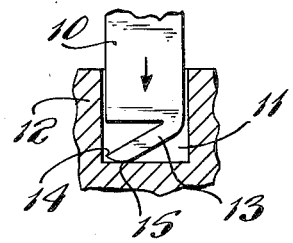
Fig. 3 is a view showing the device inserted in a cavity of the part to which it is to be attached.

In several of the views the upper part of the anchoring device has been broken away since this invention is directed simply to the portion, which may be termed the shank portion, that is to be inserted in the cavity of the part to which it is to be attached. Where the device is to be used to connect two parts, the upper half may be a mere duplication of the lower half. In the case where the anchoring device itself constitutes the attached part, the upper portion, that is the portion above the shank may be of any required form.

The device in the forms illustrated in Figs. 1 to 4 comprises a body or shank portion 10 of such shape, width and thickness as to fit easily, on simple insertion without pressure, into a preformed cavity or aperture 11 in the part 12, of plastic or other material, to which it is to be applied. The lower end of the shank has an integral, bendable, prong 13 extending at an obtuse angle to the major or longitudinal axis of the shank in the plane thereof. The tip or point 14 of the prong does not project beyond the width of the shank, however the length of the prong is such that when the prong is bent into its anchoring position shown in Fig. 4 the point 14 will protrude beyond the width of the shank to bite into the material of the wall of the cavity. The lower surface 15 of the end of prong 13 may be curved or beveled to provide a cam action that facilitates upward and outward bending movement of the prong as the latter is pressed down against the bottom 16 of the cavity by application of pressure longitudinally of the shank.

As heretofore noted, the device is inserted into the cavity or recess without pressure, and the pressure required to bend the prong into anchoring position is applied only after the device has been so inserted. While the shank and cavity are designed to have a relatively close fit, the fit need not be so tight as to necessitate that the shank be driven into the cavity, nor is it required that the tolerance be nearly as close as is the case where an insert is molded in a plastic part.

The anchoring devices may be formed complete by simply stamping them from sheet or strip stock without requiring any bending operation to form the prongs. Accordingly they may be rapidly and inexpensively manufactured in quantity.

Figure 5:
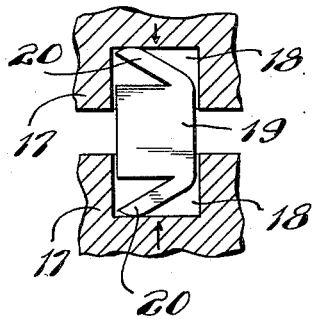
Fig. 5 shows a modified form positioned in the cavities of two parts to be joined together.

Fig. 5 illustrates one example of a device for connecting together two separate parts 17—17 each having a performed cavity 18. In this case the body or shank 19 has a prong 20 at both its upper and lower ends, which prongs function in the same manner as, and may be similar in construction to, the prong 13 previously described.

Figure 6:
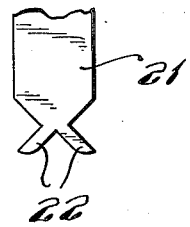
Fig. 6 is a face view of another modified form.

Fig. 6 represents a form of the device comprising a shank 21 having two diverging prongs 22 at one or both of its ends, which prongs are adapted to be spread and bent outwardly on application of longitudinal pressure.

Each of the forms described have the common characteristics that they may be inserted freely into the preformed cavities and secured therein by bending or spreading the prongs outwardly on pressing the device, or the part or parts to which it is to be anchored, relatively toward each other.

Figure 4:
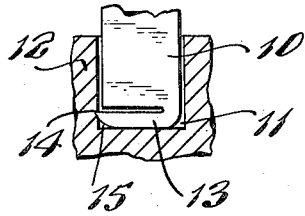
Fig. 4 is a similar view of the device in anchored position.

It will be observed that the lower end of the prong, which contacts the bottom of the cavity 11 when the anchor is inserted, is blunt and may be of convex curvature as shown, and that said end has a laterally directed tip or biting edge 14. After the anchor is inserted freely into the cavity and pressure is then applied thereon, the prong will bend as a whole about its point of connection with the shank and will slide outwardly on the bottom, without penetrating the bottom, into anchoring position with its tip or biting edge 14 engaged in the side wall of the cavity as seen in Fig. 4.

It is to be understood that the examples described are only illustrative and that the invention may be embodied in forms other than those herein specifically shown and described.

What I claim is:

1. An anchoring device comprising a metallic shank having a pair of prongs projecting divergently outward from the central part of an end of the shank towards the sides of the shank with the ends of the prongs normally lying within the projection of said sides, said prongs each comprising a substantially straight portion forming an obtuse angle with the major axis of said shank, said device being adapted for insertion freely into a preformed cavity in the body in which it is to be anchored, the free ends of said prongs being beveled on their edges most remote from the shank to provide cutting points facing outwardly, said prongs being bendable outwardly away from each other into anchoring position at substantially a right angle to the major axis of the shank by sliding movement of the ends of the prongs on the bottom of the cavity upon application of pressure on the shank in the general direction of its major axis, each prong being of a length that when bent into anchoring position its end will portrude beyond the respective side of the shank to bite into a side wall of the cavity.

2. An anchoring device comprising a metallic shank having at least one prong projecting obliquely outward from an end of the shank towards a side of the shank with the end of the prong normally lying within the projection of said side, said prong comprising a substantially straight portion forming an obtuse angle with the major axis of the shank, said device being adapted for insertion freely into a preformed cavity in the body in which it is to be anchored, the free end of said prong being beveled on its edge most remote from the shank to provide a cutting edge facing outwardly, said prong being bendable outwardly into anchoring position at substantially a right angle to the major axis of the shank by a sliding movement of the beveled end of the prong on the bottom of the cavity upon application of pressure on the shank in the general direction of its major axis, said prong being of a length that when bent into anchoring position its end will protrude beyond the side of the shank toward which it is normally directed so as to enter into a side wall of the cavity.

WILLIAM HUPPERT.

REFERENCES CITED

The following references are of record in the file of this patent:

UNITED STATES PATENTS

| Number | Name | Date |
| --- | --- | --- |
| 2,034,080 | Bitzenburger | Mar. 17, 1936 |
| 2,329,471 | King | Sept. 14, 1943 |